(12) United States Patent
Zheng et al.

(10) Patent No.: US 10,470,453 B2
(45) Date of Patent: Nov. 12, 2019

(54) MOSQUITOCIDAL LIGHT BULB

(71) Applicant: NINGBO DAYANG INDUSTRY AND TRADE CO., LTD., Ningbo (CN)

(72) Inventors: Jun Zheng, Ningbo (CN); Yuanai Ning, Ningbo (CN)

(73) Assignee: Ningbo Dayang Industry and Trade Co., Ltd., Ningbo (CN)

( * ) Notice: Subject to any disclaimer, the term of this patent is extended or adjusted under 35 U.S.C. 154(b) by 0 days.

(21) Appl. No.: 16/046,842

(22) Filed: Jul. 26, 2018

(65) Prior Publication Data

US 2019/0059349 A1    Feb. 28, 2019

Related U.S. Application Data

(63) Continuation of application No. 15/250,935, filed on Aug. 30, 2016, now Pat. No. 10,045,521.

(30) Foreign Application Priority Data

Sep. 15, 2015  (CN) .................. 2015 2 0712890 U

(51) Int. Cl.
| | | |
|---|---|---|
| *A01M 1/04* | (2006.01) | |
| *H05C 1/06* | (2006.01) | |
| *F21V 33/00* | (2006.01) | |
| *F21K 9/232* | (2016.01) | |
| *A01M 1/22* | (2006.01) | |
| *A01M 1/20* | (2006.01) | |
| *F21V 23/00* | (2015.01) | |
| *F21Y 115/10* | (2016.01) | |

(52) U.S. Cl.
CPC ................ *A01M 1/04* (2013.01); *A01M 1/20* (2013.01); *A01M 1/223* (2013.01); *F21K 9/232* (2016.08); *F21V 23/001* (2013.01); *F21V 23/005* (2013.01); *F21V 33/0064* (2013.01); *H05C 1/06* (2013.01); *F21Y 2115/10* (2016.08)

(58) Field of Classification Search
CPC .............................. A01M 1/04; A01M 1/223
USPC ........................................................ 43/132.1
See application file for complete search history.

(56) References Cited

U.S. PATENT DOCUMENTS 1,962,420 A  *  6/1934  Bradley ................... A01M 1/04
43/112
1,962,439 A  *  6/1934  Folmer .................... A01M 1/04
43/112

(Continued)

*Primary Examiner* — Christopher P Ellis
(74) *Attorney, Agent, or Firm* — Faegre Baker Daniels LLP

(57) ABSTRACT

A mosquitocidal light bulb having a seat and lighting elements; the seat is connected with a mouth of a light bulb; the seat is provided with a connecting seat; a circuit board electrically connected with the seat is provided inside the connecting seat; the circuit board includes a lighting control circuit board and a mosquito killing control circuit board; the light elements are connected to the connecting seat and electrically connected with the lighting control circuit board; a mosquitocidal device is connected with the connecting seat and electrically connected with the mosquito killing control circuit board. The mosquitocidal light bulb provided can replace an existing ordinary light bulb and uses existing wire arrangements. Therefore, it is not necessary to change the existing wire arrangements and switch controls to provide both mosquito killing function and lighting function.

1 Claim, 2 Drawing Sheets

(56) References Cited

U.S. PATENT DOCUMENTS

| | | | | |
|---|---|---|---|---|
| 2,132,371 | A * | 10/1938 | Kriwat | A01M 1/02 43/112 |
| 4,490,937 | A * | 1/1985 | Yavnieli | A01M 1/04 43/112 |
| 4,523,404 | A * | 6/1985 | DeYoreo | A01M 1/04 43/112 |
| 4,873,786 | A * | 10/1989 | Franco | A01M 1/04 43/112 |
| 6,134,826 | A * | 10/2000 | Mah | A01M 1/04 43/112 |
| 6,421,952 | B1 * | 7/2002 | Vascocu | A01M 1/04 43/112 |
| 6,502,347 | B1 * | 1/2003 | Carver, Sr. | A01M 1/04 43/113 |
| 2009/0293341 | A1 * | 12/2009 | Fleming | A01M 1/04 43/113 |
| 2010/0050499 | A1 * | 3/2010 | Liang | A01M 1/04 43/113 |
| 2014/0068999 | A1 * | 3/2014 | Singleton | A01M 1/223 43/112 |
| 2014/0190071 | A1 * | 7/2014 | Mistretta | A01M 1/223 43/112 |
| 2014/0352200 | A1 * | 12/2014 | Tremble | A01M 1/04 43/112 |
| 2017/0367314 | A1 * | 12/2017 | Billingsley, Jr. | F21V 3/061 |
| 2018/0035658 | A1 * | 2/2018 | Zheng | A01M 1/04 |

\* cited by examiner

MOSQUITOCIDAL LIGHT BULB

This application is a continuation of U.S. patent application Ser. No. 15/250,935, filed Aug. 30, 2016, which claims priority to Chinese Patent Application No. 201520712890.9, filed Sep. 15, 2015. U.S. patent application Ser. No. 15/250,935 is incorporated by reference herein for all purposes.

BACKGROUND OF THE INVENTION

The present invention relates to a mosquitocidal light bulb.

Since winged insects, bugs, mosquitoes and the like are often being attracted by lights, flocks of flying insects may often be found in places where lights are present. To avoid bites from these insects and to avoid a flock of these insects from gathering at one place, various kinds of mosquitocidal light equipment have been invented. For example, a light specifically used for killing mosquitoes uses lights to attract insects and to kill them by a high voltage electric net as the insects hit the net. Other measures may include providing a small fan, a piece of mosquito repellent incense or a layer of adhesives on the table lamp.

Among these measures and devices, mosquitocidal light is the safest and the most environmental friendly. No toxic gas will be produced during the use of mosquitocidal light. However, the use of mosquitocidal light means additional provision of a specified equipment only for killing mosquitoes. Accordingly, additional investment is required. Furthermore, the mosquitocidal light requires hanging and mounting, which consume time and energy.

BRIEF SUMMARY OF THE INVENTION

In view of the aforesaid disadvantages now present in the prior art, the present invention provides a mosquitocidal light bulb which can kill insects and which can be directly connected with an existing light bulb seat.

The present invention provides the following technical solution: A mosquitocidal light bulb comprising a light bulb seat connecting with a mouth of a light bulb, and lighting elements; wherein a connecting seat is provided on the light bulb seat; a circuit board electrically connected with the light bulb seat is provided inside the connecting seat; the circuit board comprises a lighting control circuit board and a mosquito killing control circuit board; the lighting elements are connected with the connecting seat and electrically connected with the lighting control circuit board; a mosquitocidal device is connected with the connecting seat and electrically connected with the mosquito killing control circuit board.

Preferably, the connecting seat comprises a first connecting seat and a second connecting seat; the first connecting seat and the second connecting seat are connected via annular fence formed by spaced columns.

The mosquitocidal device is connected with the first connecting seat and is positioned within the annular fence; the lighting elements are mounted on the second connecting seat The mosquito killing control circuit board is provided inside the first connecting seat; the lighting control circuit board is provided inside the second connecting seat.

An insulation sleeve for housing conductive wires is provided between the second connecting seat and the first connecting seat; the lighting control circuit board is electrically connected with the light bulb seat via the conductive wires.

In order to apply the mosquitocidal light bulb via existing wire arrangements, the lighting control circuit board and the mosquito killing control circuit board can both be electrically connected with a trigger; the trigger is electrically connected with the light bulb seat. The trigger is designed such that the same trigger in the existing wire arrangements can achieve lighting function, mosquito killing function or combined lighting and mosquito killing functions.

In each embodiment, the annular fence and the first connecting seal are formed as a one whole piece; a light shade snapped on the second connecting seat to cover the lighting elements is removably connected with the second connecting seat; the light shade is provided to protect the lighting elements and also facilitates replacement of the lighting elements.

In each embodiment, the mosquitocidal device can be any type available in the prior arts. Preferably, the mosquitocidal device may comprise a high voltage electric net and insect attracting lights; the high voltage electric net has an annular shape with a hollowed center; an upper opening of the high voltage electric net is connected with the first connecting seat; the insect attracting lights are mounted on the first connecting seat and are positioned within the high voltage electric net.

More preferably, the high voltage electric net may comprise a first connecting ring and a second connecting ring; a plurality of conductive rods mutually spaced with respect to one another are provided between the first connecting ring and the second connecting ring, To facilitate the discharge of the dead insects out of the electric net, the second connecting seat may be designed to have a conical shape; the insulation sleeve is connected with a vertex of the second connecting seat; dead bodies of the insects when fallen on the second connecting seat will automatically slide down the tapered surface of the second connecting seat due to pulling of their own weights, and then out of the high voltage electric net through the gaps between the high voltage electric net and the gaps between the spaced columns of the annular fence. Discharging the dead insects can prevent awful smells of accumulated insect dead bodies.

Preferably, the lighting elements may be formed by a plurality of LEDs.

Compared with the prior arts, the mosquitocidal light bulb provided by the present invention can directly replace the ordinary light bulb functioning on existing wire arrangements. Therefore, it is not necessary to change the existing wire arrangements and switch controls. Moreover, the present invention provides both mosquito killing function and lighting function.

DETAILED DESCRIPTION OF THE INVENTION

Figure 1:
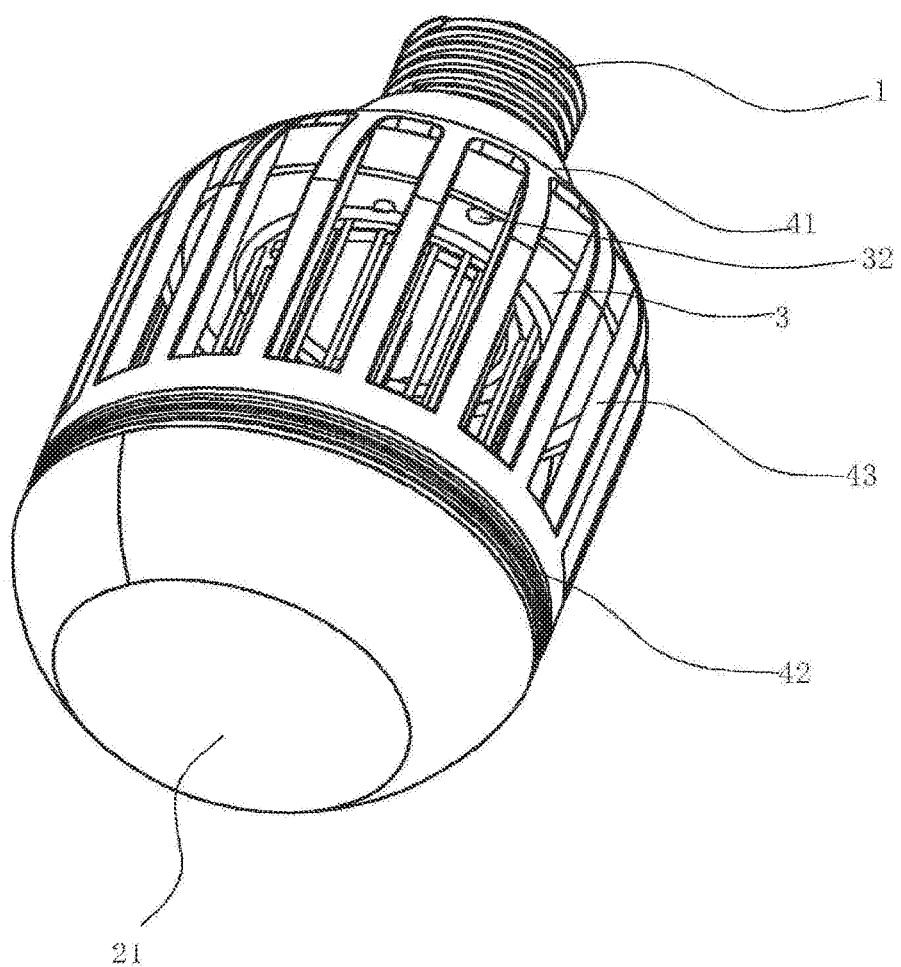
FIG. 1 is a perspective structural view of the present invention in an assembled condition.
Figure 2:
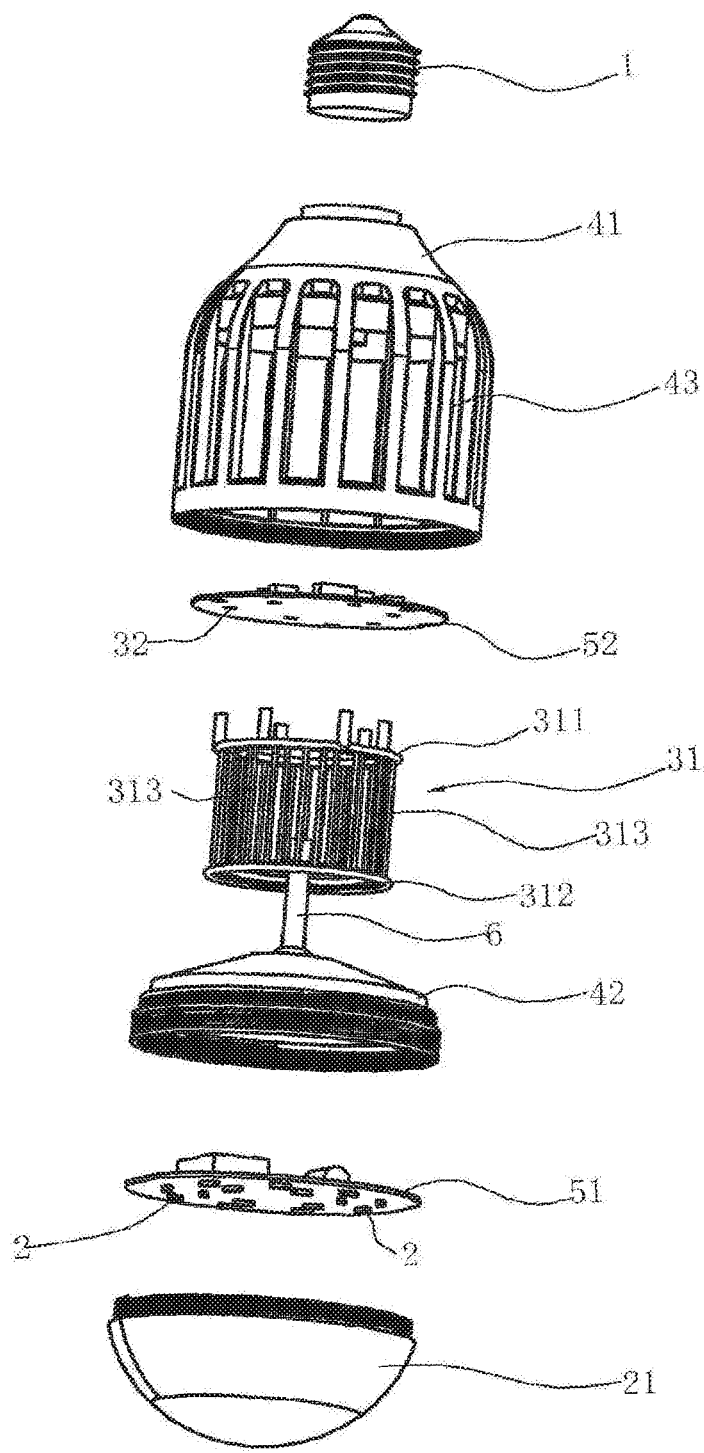
FIG. 2 is an exploded view of the present invention.

The present invention is described further in detail below with reference to an embodiment illustrated in the accompanying drawings, As shown in FIGS. 1-2, a mosquitocidal light bulb comprises:

A light bulb seat 1, which is an ordinary light bulb seat available nowadays. The light bulb seat can be threaded or provided with a snap-fit structure for connection with a mouth of a light bulb.

A connecting seat, comprising a first connecting seat 41 and a second connecting seat 42; the first connecting seat 41 is connected to the light bulb seat 1; a mosquito killing control circuit board 52 and a trigger is provided inside the first connecting seat 41; the second connecting seat 42 is provided below the first connecting seat 41; the first connecting seat 41 and the second connecting seat 42 are connected via an annular fence 43 formed by spaced columns and an insulation sleeve 6. In this embodiment, the annular fence 43 and the first connecting seat 41 are formed as a one whole piece, and the second connecting seat 42 is connected to an edge of another end of the annular fence 43 by threaded connection; the second connecting seat 42 is also connected with a light shade 21 by threaded connection.

The second connecting seat 42 has a conical shape; the insulation sleeve 6 is provided between the first connecting seat 41 and the second connecting seat 42; the insulation sleeve 6 is connected between a vertex of the second connecting seat 42 and the first connecting seat 41; in other ds, the insulation sleeve 6 is positioned in a middle part between the first connecting seat and the second connecting seat.

A lighting control circuit board 51 is provided inside the second connecting seat 42; the lighting control circuit board 51 is electrically connected to the trigger (not shown in the figures) inside the first connecting seat 41 via wires (not shown in the figures) inside the insulation sleeve 6; the trigger is electrically connected with the light bulb seat 1.

Lighting elements 2, comprising a plurality of LEDs mutually spaced with respect to one another and mounted on the second connecting seat 42; the lighting elements 2 are electrically connected with the lighting control circuit board 51 In this embodiment, the light shade 21 is provided over and covers the light elements 2; the light shade 21 is connected with the second connecting seat 42 by threaded connection to facilitate replacement of the lighting elements 2.

A mosquitocidal device 3 connecting with the first connecting seat 41 and positioned within the annular fence 43; the mosquitocidal device 3 comprises a high voltage electric net 31 and insect attracting lights 32; the high voltage electric net 31 comprises a first connecting ring 311 and a second connecting ring 312; conductive rods 313 mutually spaced with respect to one another are provided between the first connecting ring 311 and the second connecting ring 312.

The mosquitocidal light bulb of the present invention has the following working principle:

When lighting is required, press a switch (not shown in the figures) once to trigger a first trigger of the trigger so as to close a lighting control circuit. Accordingly, the LEDs will be lighted up to provide lighting.

When it is necessary to enable mosquito killing function when the light bulb is lighted up, press the switch again to trigger a second trigger of the trigger. Accordingly, the lighting control circuit and also a mosquito killing circuit are closed simultaneously. The insect attracting lights and the lighting elements are lighted up simultaneously so as to attract insects by using the insect attracting lights and at the same time provide ordinary lighting function. When insects touch the high voltage electric net, they will be killed by the high voltage electricity. The dead bodies of the insects fall onto the second connecting seat and slide along the tapered surface of the second connecting seat and out of the high voltage electric net through the gaps on the high voltage electric net and the gaps between the spaced columns of the annular fence.

When lighting is no longer required, press the switch to trigger a third trigger of the trigger to cut off the lighting control circuit. The mosquito killing circuit n this condition is still closed.

When the switch is pressed for the fourth time to trigger a fourth trigger of the trigger, both the lighting control circuit and the mosquito killing circuit will be cut off.

What is claimed is:

1. A mosquitocidal light bulb, comprising:
   a light bulb seat; and
   lighting elements;
   wherein:
   a connecting seat is provided on the light bulb seat;
   a circuit board electrically connected with the light bulb seat is provided inside the connecting seat;
   the circuit board comprises a lighting control circuit board and a mosquito killing control circuit board;
   the lighting elements are electrically connected with the lighting control circuit board; and
   a mosquitocidal device is electrically connected with the mosquito killing control circuit board;
   wherein:
   the connecting seat comprises a first connecting seat and a second connecting seat;
   the first connecting seat and the second connecting seat are connected via an annular fence formed by spaced columns;
   the mosquitocidal device is connected with the first connecting seat and is positioned within the annular fence;
   the lighting elements are mounted on the second connecting seat;
   the mosquito killing control circuit board is provided inside the first connecting seat;
   the lighting control circuit board is provided inside the second connecting seat;
   an insulation sleeve for housing conductive wires is provided between the second connecting seat and the first connecting seat; and
   the lighting control circuit board is electrically connected with the light bulb seat via the conductive wires;
   wherein:
   the second connecting seat includes a conical shape; and
   the insulation sleeve is connected with a vertex of the second connecting seat;
   wherein the lighting elements are formed by a plurality of LEDs.

\* \* \* \* \*